July 29, 1969  R. M. SCHROEER ET AL  3,457,770
THERMAL TESTING APPARATUS

Filed Jan. 9, 1967  3 Sheets-Sheet 1

INVENTORS
RUDI M. SCHROEER
JOHANN E. FRANK
RONALD E. TINSLEY
BY
ATTORNEYS

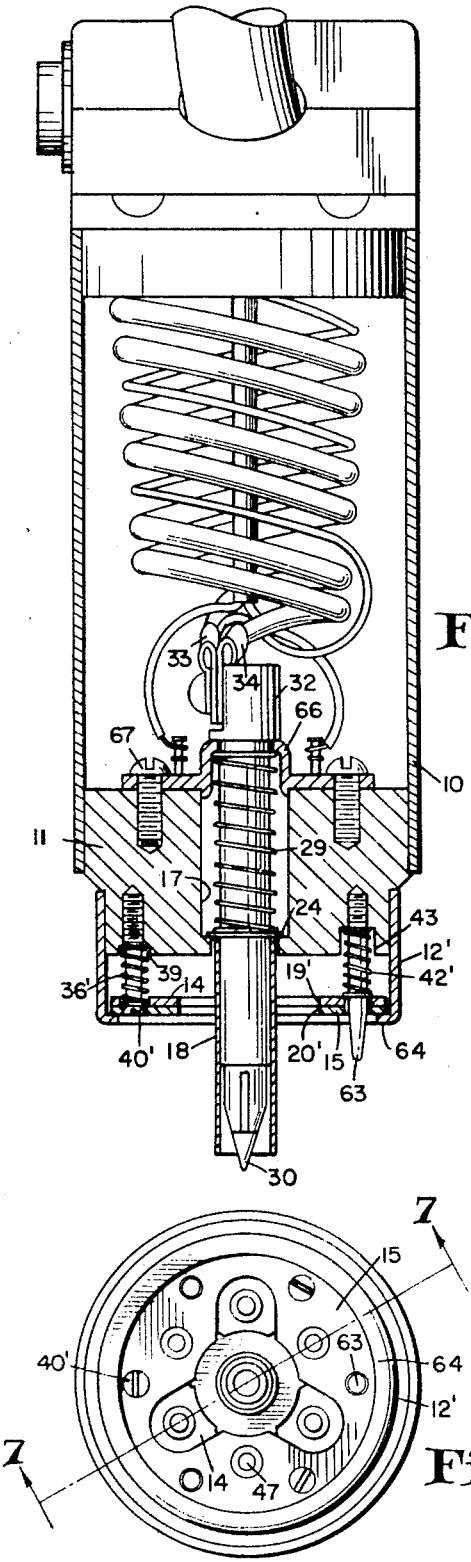
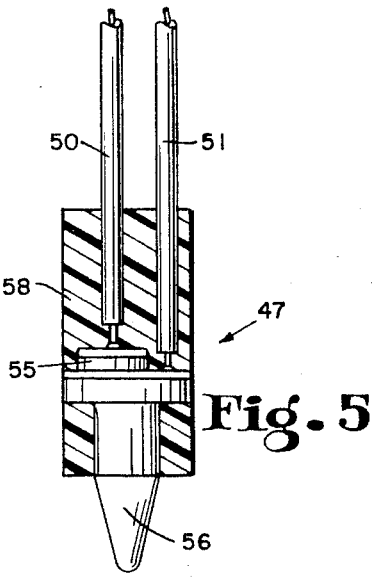
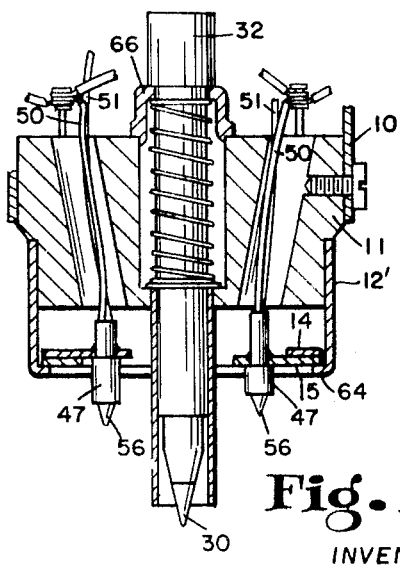
INVENTORS
RUDI M. SCHROEER
JOHANN E. FRANK
RONALD E. TINSLEY

United States Patent Office 3,457,770
Patented July 29, 1969

3,457,770
THERMAL TESTING APPARATUS
Rudi M. Schroeer, Enon, Johann E. Frank, Yellow Springs, and Ronald E. Tinsley, Springfield, Ohio, assignors to Arvin Systems, Inc., Dayton, Ohio, a corporation of Ohio
Filed Jan. 9, 1967, Ser. No. 608,126
Int. Cl. G01h 25/18
U.S. Cl. 73—15
20 Claims

ABSTRACT OF THE DISCLOSURE

An apparatus for measuring the quality of the interconnection between two pieces of interconnected metal. Such measurement is determined by applying heat to a point of interconnection between the pieces, and measuring the rate of heat distribution to areas adjacent the point where the heat is applied. If the interconnection is of good quality, the heat will be conducted away from said point more rapidly than in the case of a poor quality interconnection.

---

This invention relates to an apparatus for measuring the strength of the connection between a pair of interconnected members, and is thus particularly well adapted for determining the quality of a weld between a pair of metallic members.

It is an object of the invention to provide a testing apparatus which will measure the thermoconductivity of a workpiece, which will give accurate and rapid measurement readings, which can be used on relatively small work-pieces, and which can be used on work-pieces of irregular contour.

According to one form of the invention, there is provided a probe comprising a housing having a spring loaded heating electrode therein connected to a low-voltage power supply. A plurality of heat sensing elements are also spring-loaded within the housing and are disposed at equal distances from the electrode and from each other.

In testing a work-piece comprising two pieces of metal interconnected by a weld, the electrode is placed on said weld and the sensing elements are placed on the upper or adjacent piece of metal. One side of said power supply is coupled to said electrode and its other side is connected to the work-piece, whereby the current flowing through this circuit causes the heating electrode to heat the weld. Conveniently, the sensing elements are provided with thermistors whose resistance decreases with increase in temperature. Said elements are wired in parallel to sense the average temperature of the work-piece around the electrode, and this parallel combination forms one branch of a Wheatstone bridge. The output of the bridge is fed through differentiating means to a meter for measuring the rate of change of the temperature of the work-piece immediately adjacent the point of contact of the electrode on said work-piece.

If two pieces of metal are intimately bonded together, as by a high quality weld, the heat applied to the weld from the electrode will be quickly dissipated into both pieces of metal. If, on the other hand, the weld is of poor quality, the heat applied to said weld by said electrode will not be quickly dissipated into both pieces of metal, so that the temperature of said adjacent piece of metal to which the sensing elements are applied will rise rapidly. Therefore, if the meter indicates that there is a relatively slow rate of temperature increase in said adjacent piece of metal, the interconnection between the two pieces of metal constitutes an intimate connection, as is the case of a good weld joint. If there is a rapid rate of temperature increase in said adjacent piece of metal, then the heat emanating from the electrode is not being properly conducted into the second or lower piece of metal and the connection is not intimate.

To attain a high degree of accuracy, additional circuitry is provided. The theory underlying the invention depends on the predictability of the rate of heat rise in a good connection between the pieces forming the workpiece, as distinguished from the predictability of the rate of heat rise in a poor connection. This necessitates uniform conditions from one test to the next, and requires either that the heat applied be the same for each consecutive test, or that the meter circuitry compensate for such changes in conditions. This requirement of keeping the applied heat constant from one test to the next is difficult to attain since the line voltage providing the source of power to the electrode may vary, and since the heat applied by the electrode is directly proportional to the voltage applied to it. Other variations in heat from one test to the next may be cause by contamination on the work-piece or by irregular contours in the bond being tested, both of which result in poor contact between the electrode and bond. Such poor contact will increase the resistance seen by the power source and therefore cause a lower voltage to be dropped across the heating element, thereby decreasing the amount of heat applied to the work-piece. These causes of inaccuracy are alleviated by a detecting circuit which detects the actual power applied by the power source. That is, the output of the detecting circuit is a voltage which is proportional to the product of the voltage and current supplied by the power source. If the power source voltage does not change from one test to the next, and if there is proper contact with the work-piece so that there is no change in the resistance seen by the power source, then the voltage and current product will not change. If, however, either quantity of the product changes, the result is used to compensate the meter circuit for the change in the applied heat.

Other objects and features of the invention will become apparent from the more detailed description which follows and from the accompanying drawings, in which:

FIG. 5 is an enlarged sectional view of one of the sensing elements shown in FIG. 2;

FIG. 6 is a longitudinal section through a modified embodiment of the thermal testing probe shown in FIG. 1;

FIG. 7 is a fragmentary longitudinal section taken on the line 7—7 of FIG. 8;

FIG. 8 is a bottom plan view of the probe shown in FIG. 6; and

Figure 1:
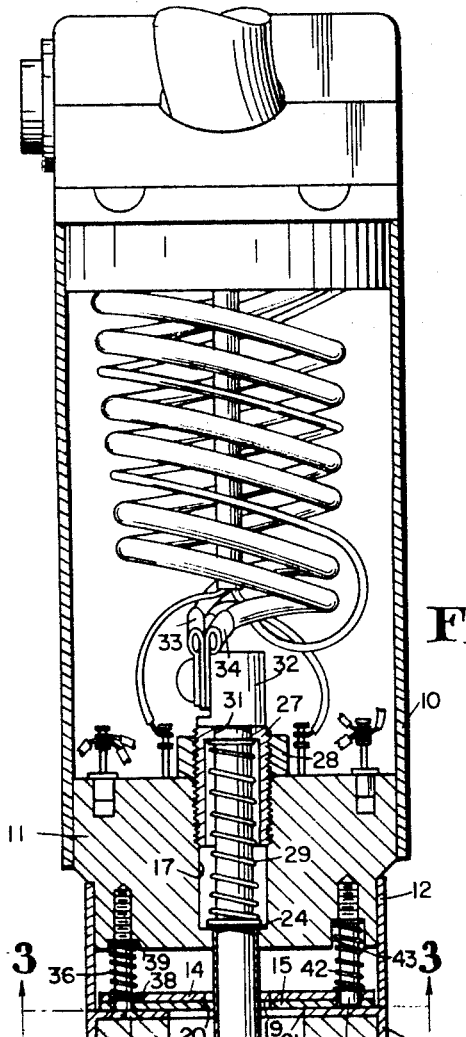
FIG. 1 is a longitudinal section through a thermal testing probe embodying the invention.

For ease of description, our invention will be described herein for measuring the quality of a weld connection between two pieces of metal constituting the work-piece. It is to be understood, however, that the invention can be employed to measure the intimacy with which two pieces of metal are interconnected, irrespective of the method of inteconnection.

A good weld will transfer heat better than a bad weld. If heat is applied to the surface of a weld bonding two pieces of metal together, the heat will be conducted throughout the two pieces in a hemispherical pattern. Two general directions of the heat flow pattern are of significant interest; the heat flow laterally in all directions from the weld through the surface of the first piece of metal, and the downward flow of heat through the weld column to the second piece of metal. The proportion of the quantity of heat transferred laterally to that transferred downwardly changes significantly from good to bad welds. A poor weld will not provide as efficient a downward heat transfer as a good weld. Therefore, a greater amount of heat will be transferred laterally to the first piece of metal to which the heat is applied in the case of a bad weld. By heating the weld surface under controlled conditions specific measurement values for good and bad welds can be established. The rate of heat change is detected and recorded for a series of welds, and the samples are then given a physical test, as by measuring the force required to separate the pieces of metal, to determine the quality of the welds. The data on the rate of heat change is then compared with the results of the physical tests to distinguish between the curves for rate of heat change. Therefore, this invention provides a nondestructive method for testing welds or other connections to determine their quality.

As shown in FIGS. 1–4, there is provided a sensing probe carried in a housing 10. The lower end of said housing is enclosed by a plug 11 having a downwardly projecting collar 12 mounted thereon. The bottom of the collar is connected to the closed end of an inverted cup 13 which supports a pair of plates 14 and 15 slidably carried in said collar. For reasons that will become apparent hereinafter, an annular magnet 16 is mounted in the cup 13.

As best shown in FIG. 1, the plug has a counterbored opening 17 extending therethrough, and a sleeve 18 is slidably carried in said opening and projects downwardly from said plug through openings 19 and 20 in plates 14 and 15, and through openings 21 and 22 in said cup and magnet, respectively. A flange 24 is formed on the upper end of the sleeve to seat against the base of the counterbore in opening 17 to limit the downward sliding movement of said sleeve. A guide cap 27 is threadably mounted in the opening 17 in the plug, and is locked in place therein by a nut 28. A spring 29 is carried on sleeve 18 and bears against the sleeve flange 24 and cap 27 for urging said sleeve outwardly beyond the magnet 16. A heating electrode 30 is fixedly mounted in sleeve 18 for movement therewith, with its tip projecting outwardly beyond the end of said sleeve. Said electrode projects upwardly through spring 29 and an opening 31 in the cap 27 and has a terminal clamp 32 mounted thereon for connecting it to a pair of lead-in wires 33 and 34.

As shown, plate 15 is biased downwardly against the cup 13 by a plurality of arcuately spaced coil springs 36 bearing against plate 15 and extending through opening 38 in plate 14 and seated in recesses 39 in plug 11. Said springs are held in place by a plurality of screws 40 which pass through the springs and through the plates 14 and 15 and attach the cup 13 to the plug 11. Plate 14 is biased downwardly against plate 15 by a plurality of arcuately spaced coil springs 42 bearing against plate 14 and seated in counterbored openings 43 in plug 11. Desirably, springs 42 are retained in place by a plurality of pins 44 extending through plates 14 and 15 and said springs and threadably received in the plug openings 43.

Figure 2:
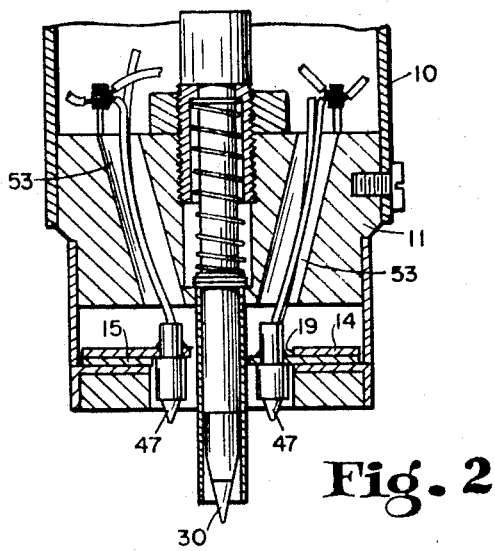
FIG. 2 is a fragmentary longitudinal section taken on the line 2—2 of FIG. 3.
Figure 4:
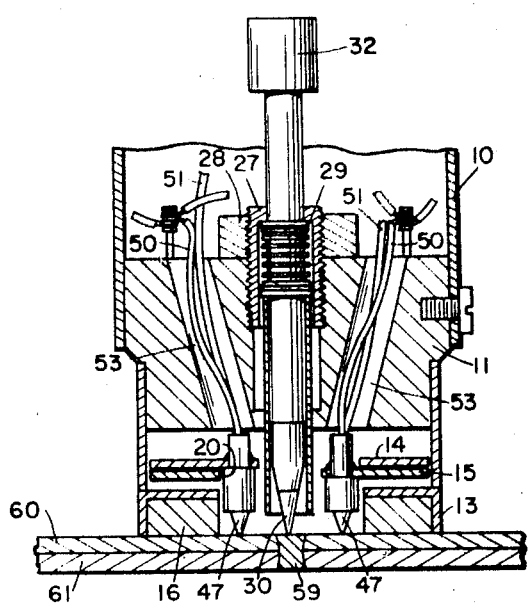
FIG. 4 is a longitudinal section similar to FIG. 2, but showing the probe in operative testing position.
Figure 3:
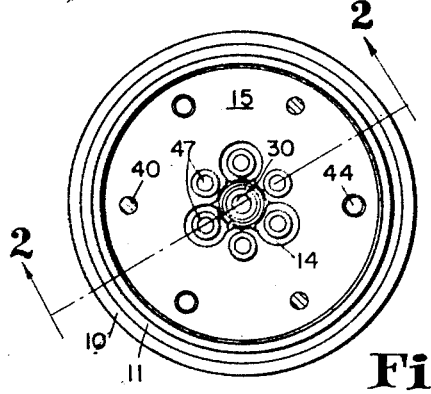
FIG. 3 is a sectional view of the probe taken along lines 3—3 of FIG. 1.

As shown in FIGS. 2–4, three sensing elements 47 are mounted on each of the plates 14 and 15 is arcuately spaced relation and equally radially spaced from the electrode 30. The sensing elements mounted on plate 14 project through the opening 20 in the plate 15, and the sensing elements mounted on plate 15 have their upper ends extending upwardly through the opening 19 in the plate 14. The electrical leads 50 and 51 for the sensing elements extend upwardly into the housing through a plurality of openings 53 formed in plug 11.

As shown in FIG. 5, each of the sensing elements 47 comprises a thermistor 55 connected to lead 50 and mounted on a copper tip 56 connected to lead 51. The thermistor and wire connections are encapsulated, as at 58, in an electrically insulating material.

As shown in FIG. 4, when the probe is placed on a workpiece, as to measure the quality of a weld 59 between a pair of metal sheets 60 and 61, the electrode 30 is placed against the weld and said electrode and its sleeve 18 are slid upwardly into the probe against the action of spring 29 until the magnet 16 engages the sheet 60. In such position, the tips of the sensing elements 47 bear against sheet 60 around the electrode 30, the movement of the sensing elements against said sheet being cushioned by the springs 36 and 42 bearing against the plates 14 and 15. When current is applied to the electrode, the weld 59 will be heated, and the sensing elements will measure the heat transmitted laterally outwardly from said weld. As shown, sleeve 18 tends to prevent direct heat transfer from the electrode to the sensing elements, and the magnet 16 holds the probe in a proper operative position on the work-piece and serves as a stop for limiting upward movement of the electrode and sensing elements.

A modified embodiment of the probe is shown in FIGS. 6–8 and differs from the embodiment shown in FIGS. 1–4 primarily in the elimination of the magnet. As shown in FIGS. 6 and 8, a plurality of pins 63 are adjustably mounted in the plug 11 and project below the plates 14 and 15 which are slidably carried in collar 12' and supported on a flange 64 formed on said collar. The plate 15 is biased against said flange by springs 42' carried on said pins and bearing against said plate and the plug 11. Plate 14 is biased against plate 15 by springs 36' bearing against plate 14 and plug 11 and carried on screws 40' mounted in said plug. The pins 63 serve as stops for limiting the downward movement of the probe against the work-piece and thus normally have their lower ends disposed above the lower ends of the sensing element tips 56 when the sensing elements are biased into their lowermost position by the springs 36' and 42'.

The embodiment shown in FIGS. 6–8 also differs from the embodiment shown in FIGS. 1–4 in that the cap 27 is replaced by an apertured yoke 66 mounted on the upper face of the plug by screws 67.

Figure 9:
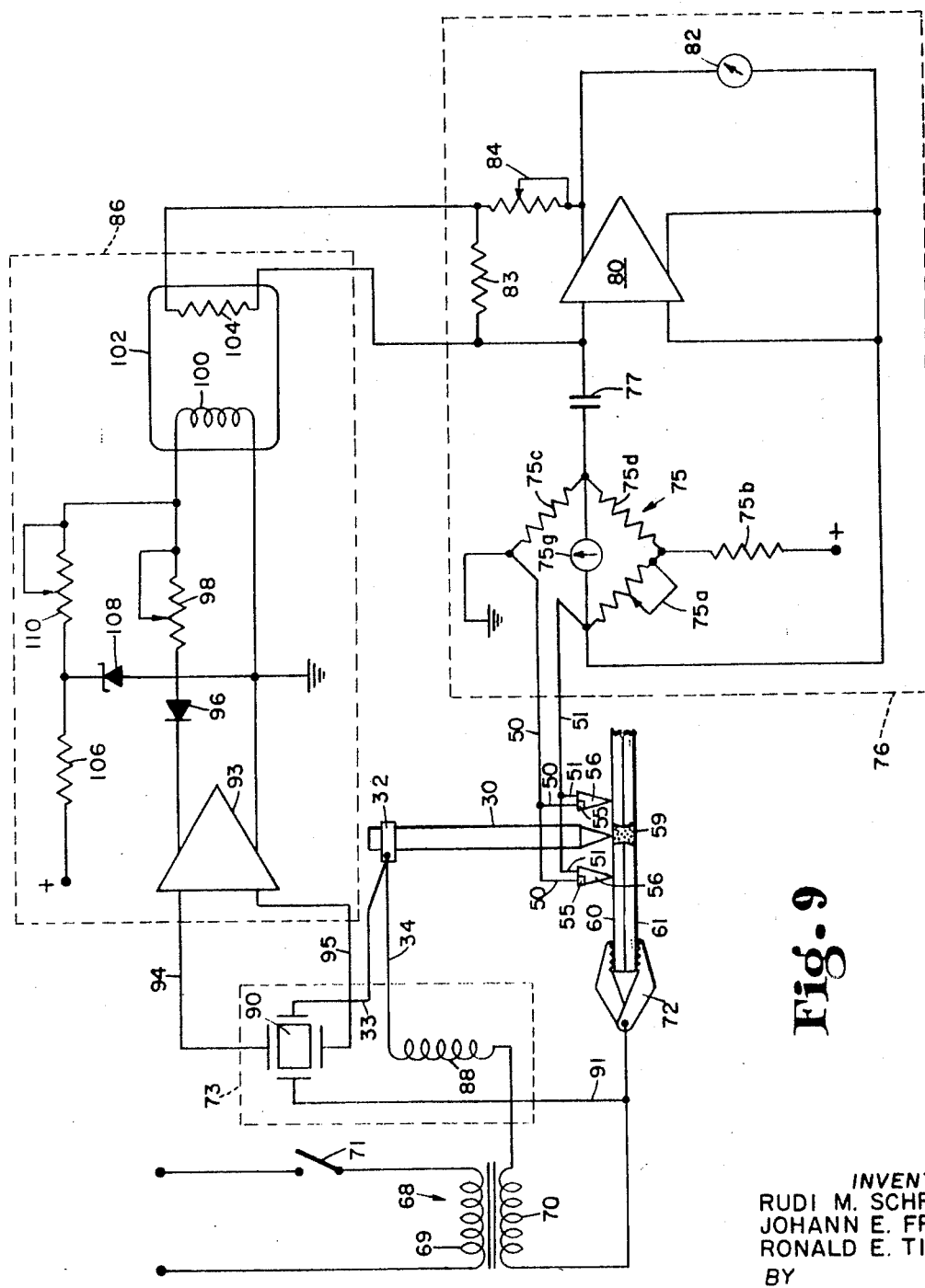
FIG. 9 is a schematic diagram of the circuitry embodying the invention.

As shown in FIG. 9, a power supply for the electrode 30 comprises a transformer 68 having a primary 69 connected to a source of AC power, and a secondary 70, and being controlled by a push button switch 71. Switch 71 may be a timing switch which, when closed, energizes the circuit for a particular length of time. One side of the secondary 70 is connected to the work-piece 59–61, as by a clamp 72, while the other side is coupled through a detecting circuit or Hall Generator 73 to the electrode 30. Thus, when switch 71 is closed, a current passes through the electrode 30 causing it to heat the workpiece.

The thermistors 55, whose resistances change in proportion to temperature changes, have their leads 50 connected together. The leads 51 on the copper tips 56 on the sensing elements are also connected together. Thus, all of the sensing elements are connected in parallel and the leads 50 and 51 are connected to a Wheatstone bridge 75, in the sensing circuit 76 shown in FIG. 9, and form one branch thereof. Lead 51 is coupled through a potentiometer 75a which forms another branch of the bridge, and through a resistor 75b to a point of positive potential. Resistors 75c and 75d form the remaining two branches of the bridge. Lead 50 is connected through resistor 75c and through resistor 75d to the junction of resistors 75a and 75b. The junction of resistors 75c and 75d forms the output of the bridge circuit, and the juncton of leads 50 and resistor 75c is connected to ground. The connection of lead 51 forms the common point of the bridge and a galvanometer 75g is connected between the common point and the output of the bridge for balance purposes.

The output of the bridge 75 is coupled through a capacitor 77 to the input of an operational amplifier 80 whose output is connected to one side of an indicating means such as an ammeter 82. The other side of the ammeter is coupled to the common point of the amplifier 80 and to the common point of the bridge. The series combination of a resistor 83 and a potentiometer 84 is connected across the amplifier 80 from input to output. An operational amplifier having a capacitive input impedance and a resistive feedback impedance functions as a differentiating circuit. Therefore, the output of the amplifier 80 gives an indication of the rate of change of temperature as sensed by the thermistors, and this output is applied to the ammeter 82.

The readings on ammeter 82 are a function of the heat applied to the weld 59 and the rate at which it is conducted through sheet 60. In testing various work-pieces the heat applied to the welds on said work-pieces will vary with changes in the line voltage applied to the primary 69 and with changes in contact resistance between the electrode 30 and the welds. As will hereinafter be described, the generator or detecting circuit 73 and compensating circuit 86 compensate the readings on ammeter 82 in response to changes in actual power applied to the electrode from the transformer 68.

The Hall Generator 73 has a current sensing element 88 and a voltage sensing and output portion 90. The Hall Generator 73 is a magnetic circuit consisting of a core and coil with a Hall effect magnetic sensing element positioned in a small air gap in the flux path. The output voltage $E_H$ appears as a result of deflectiton of current carriers $I_c$ by the perpendicular magnetic field B through the sensing element, and follows the equation:

$$E_H = K_H \cdot I_c \cdot B$$

B is proportional to a current $I_f$ so that we can write:

$$E_H = K_H \cdot I_c \cdot I_f$$

wherein $K_H$ is the magnetic circuit transfer factor, $I_f$ is the field current input, and $I_c$ is the Hall current input.

Applying this generator to measure the heat input during the test cycle, $I_f$ is the current going through the heating electrode and $I_c$ is a current proportional to the voltage across the heating electrode. Therefore, the two inputs are AC signals, $I_f \cdot \cos wt$ and $I_c \cdot \cos wt$, with no phase difference between them. The output is $$E_H = K_m \cdot I_f \cdot \cos wt \cdot I_c \cdot \cos wt$$

or $$= K_m \cdot I_f \cdot I_c + K_m \cdot I_f \cdot I_c \cdot \cos wt$$

The first term is a DC term proportional to the product of the two AC input signal amplitudes, while the second term is a double frequency voltage also proportional to the product of the two input signals. This output signal is coupled to an amplifier 93 which amplifies the AC components of the signal.

The generator's current sensing element 88 couples one side of the secondary 70 to the electrode 30. The voltage sensing portion 90 of the generator is coupled to the electrode 30 by the lead 33 and to the work-piece by a lead 91. The output of the generator, which is connected to the amplifier 93 by leads 94 and 95, is proportional to the product of the voltage and the current being put out by the secondary 70. The output of the amplifier 93 is coupled through diode 96 and a potentiometer 98 to the filament 100 of a raysistor 102. The raysistor has a photocell 104 whose resistance decreases as light from the filament increases. This photocell resistance 104 is connected in parallel with the resistor 83 to vary the feedback resistance of the operational amplifier 80 in accordance with heating power variations in the electrode 30. Therefore, the photocell resistance compensates the sensing circuit for any changes in the heating circuit. The generator 73 detects any changes in the heating circuit and alters the resistance of the photocell, thereby varying the feedback resistance of the operational amplifier 80 and compensating the sensing circuitry for said changes.

In the absence of the generator 73 and compensating circuit 86, if the power source voltage was increased, a greater amount of heat would be applied to the work-piece 59–61 and the ammeter 82 would indicate that there was a weld joint of poor quality. However, with the generator and compensating circuit, such an increase in voltage is detected by the generator 73 which in turn causes the photocell resistance 104 to decrease which thereby decreases the gain of the operational amplifier 80 so that the ammeter 82 indicates a weld joint of good quality. Similarly, if a contaminated weld joint was encountered causing an increase in the load resistance seen by the transformer 68, a lesser amount of heat would be applied to the work-piece 59–61, thereby indicating a good joint when possibly the joint was a poor one. To compensate for this, the generator 73 detects the lesser current. Therefore, the product $E \times I$ is lower, causing the light of the filament 100 to be dimmer than normal and causing photocell 104 to increase in resistance. This increase in resistance increases the gain of the operational amplifier 80 thereby compensating for the contaminated joint.

Since the measurement is based upon the rate of change of temperature with respect to time, and since the time involved is relatively short, the filament 100 of the raysistor 102 must react quickly or supply the proper feedback resistance. The reaction of the filament 100 and consequent change in the resistance of the photocell 104 is too slow when the filament must be heated from ambient temperature at the time of the test. Therefore, a bias circuit is included which applies a constant bias current to the filament 100 thereby increasing its sensitivity to the amplifier 93 output. The bias circuit comprises a resistor 106, one side of which is tied to a positive voltage and the other side of which is connected to the anode of a Zener diode 108 and to one side of a potentiometer 110. The cathode of the diode 108 is connected to ground, while the other side of the potentiometer 110 is connected to the junction of potentiometer 98 and filament 100. The arm of the potentiometer is also connected to this junction. The Zener diode 108 regulates the voltage applied to the filament and therefore the positive voltage may vary while the bias current to the filament 100 remains constant. The potentiometer 110 allows the current to the filament to be adjusted when the system is being calibrated. Similarly, potentiometers 98 and 84 provide means to accurately calibrate the system.

We claim:

1. A thermal testing apparatus, comprising a probe having a heat generative member carried therein for heating a localized area of a work-piece, a plurality of parallel wired sensing elements carried in said probe and engageable with said work-piece at a plurality of points for sensing the temperature at said plurality of points, mounting means mounting said sensing elements in two groups of three in said probe, biasing means acting on said mounting means for separately urging each of said groups of sensing elements outwardly from said probe, and means operatively connected to said sensing elements for indicating the average rate of temperature change at said plurality of points.

2. A thermal testing apparatus as set forth in claim 1 in which said mounting means comprises a pair of plates movably mounted in said probe and each having one of said groups of sensing elements connected thereto, and said biasing means comprises pluralities of springs bearing against said plates.

3. A thermal testing apparatus, comprising a probe having an elongated housing, a plug mounted in one end of said housing, a collar mounted on said plug and projecting outwardly therefrom, a pair of plates movably carried in said collar, a heating element movably carried in said plug and projecting outwardly through openings in said plates for heating a localized area of a work-piece, a plurality of sensing elements mounted on each of said plates and projecting outwardly therefrom for engagement with said work-piece at a plurality of points spaced from said localized area, biasing means urging said plates to move said sensing elements into engagement with said work-piece, and means operatively connected to said sensing elements for indicating the average rate of temperature change at said plurality of points.

4. The invention as set forth in claim 3 in which said plates are disposed in vertical alignment in said collar, retaining means are provided on said collar for limiting the downward movement of said plates, and said biasing means comprises a plurality of springs bearing against the lower plate urging it toward said retaining means and a plurality of springs bearing against the upper plate urging it toward said lower plate.

5. The invention as set forth in claim 4 in which the said springs are carried on a plurality of pins mounted in said plug and extending through openings in said upper and lower plates.

6. A thermal testing apparatus, comprising a probe having an elongated housing, a plug mounted in one end of said housing, a collar mounted on said plug and projecting outwardly therefrom, plate means movably carried in said collar, a heating element movably carried in said plug and projecting outwardly through openings in said plate means for heating a localized area of a work-piece, a plurality of sensing elements mounted on said plate means and projecting outwardly therefrom for engagement with said work-piece at a plurality of points spaced from said localized area, a plurality of springs acting between said plug and said plate means for urging said plate means to move said sensing elements into engagement with said work-piece, and means operatively connected to said sensing element for indicating the average rate of temperature change at said plurality of points.

7. The invention as set forth in claim 6 with the addition that stop means are mounted on said probe for limiting the upward movement of said heating and sensing elements into said probe upon their engagement with said work-piece.

8. The invention as set forth in claim 7 in which said stop means comprises an annular magnet operatively connected to said collar and projecting downwardly therefrom.

9. The invention as set forth in claim 7 in which said stop means comprises a plurality of pins mounted in said plug and projected downwardly through openings in said plate means.

10. The invention as set forth in claim 7 in which said stop means comprises a plurality of pins mounted in said plug and projecting downwardly through openings in said plate means, and said biasing means are mounted on said pins.

11. The invention as set forth in claim 6 in which said heating element comprises an electrode mounted in a sleeve slidably carried in said plug and projecting downwardly through said plate means, the lower end of said electrode projecting below the lower end of said sleeve.

12. The invention as set forth in claim 11 with the addition that guide means are mounted on said plug for guiding the movements of said electrode and sleeve, and biasing means act between said guide means and sleeve to urge said sleeve and electrode downwardly and outwardly from said plug.

13. The invention as set forth in claim 6 in which each of said sensing elements comprises a thermistor mounted on a heat-conductive tip, said thermistor and its connection to said tip being encapsulated in an insulating material.

14. In a thermal testing apparatus having a probe provided with an electrical heating element and heat sensing means for heating a localized area of a work-piece and sensing the temperature of said work-piece, respectively, a power source for said heating element, a sensing circuit coupled to said heat sensing means having indicating means and differentiating means whereby said differentiating means will cause said indicating means to measure the rate of change of temperature in said work-piece in response to the signal transmitted to said sensing circuit from said heat sensing means, a detecting circuit for detecting changes in power applied to the heating element having its input coupled to the power input to said heating element, and a compensating circuit having its input coupled to the output of said detecting circuit and its output coupled to said sensing circuit to vary the signal applied to said indicating means in response to changes in power applied to the heating element.

15. The invention as set out in claim 14, in which said detecting circuit comprises means connected to said power source and heating element for generating an output signal directly proportional to the product of the current and voltage applied to said heating element.

16. The invention as set out in claim 14 in which said compensating circuit comprises a raysistor having a filament coupled to the output of said detecting circuit and light-sensitive means coupled to said sensing circuit, said light-sensitive means having an electrical resistance which varies with the intensity of light supplied thereto by said filament.

17. The invention as set out in claim 16 with the addition that said filament of said raysistor is coupled in series with a bias circuit which supplies a constant current to said filament, thereby increasing the sensitivity of said raysistor.

18. The invention as set out in claim 14 in which said heat sensing means comprises a plurality of parallel wired thermistors, and said sensing circuit has a Wheatstone bridge coupled to said differentiating means and to said plurality of thermistors, said plurality of thermistors forming one branch of said bridge.

19. The invention as set out in claim 14 in which said differentiating means comprises an operational amplifier having a capacitively coupled input and a resistive feedback impedance.

20. The invention as set out in claim 19 in which said compensating circuit comprises a raysistor having a filament coupled to the output of said detecting circuit and light-sensitive means coupled to said sensing circuit having an electrical resistance which varies inversely with the intensity of light supplied by said filament, said light-sensitive means constituting at least a portion of said resistive feedback impedance of said operational amplifier.

References Cited

UNITED STATES PATENTS

| | | | |
|---|---|---|---|
| 2,587,705 | 3/1952 | De Forest | 73—15 |
| 3,222,917 | 12/1965 | Roth | 73—15 |
| 3,369,389 | 2/1968 | Schroeer et al. | 73—15 |

RICHARD C. QUEISSER, Primary Examiner

R. S. SALZMAN, Assistant Examiner